(12) United States Patent
Ooms et al.

(10) Patent No.: US 8,106,144 B2
(45) Date of Patent: Jan. 31, 2012

(54) PROCESS FOR PRODUCING POLYCARBONATE

(75) Inventors: Pieter Ooms, Krefeld (DE); Andreas Bulan, Langenfeld (DE); Rainer Weber, Odenthal (DE); Johann Rechner, Kempen (DE); Michael Traving, Burscheid (DE)

(73) Assignee: Bayer MaterialScience AG, Leverkusen (DE)

( * ) Notice: Subject to any disclaimer, the term of this patent is extended or adjusted under 35 U.S.C. 154(b) by 71 days.

(21) Appl. No.: 12/784,850

(22) Filed: May 21, 2010

(65) Prior Publication Data

US 2010/0324256 A1 Dec. 23, 2010

(30) Foreign Application Priority Data

Jun. 4, 2009 (DE) .................. 10 2009 023 940

(51) Int. Cl.
C08G 64/00 (2006.01)
C08G 63/02 (2006.01)
(52) U.S. Cl. .................. 528/200; 528/196; 528/198
(58) Field of Classification Search .......... 528/196, 528/198, 200
See application file for complete search history.

(56) References Cited

U.S. PATENT DOCUMENTS

| | | | |
|---|---|---|---|
| 2,970,131 A | 1/1961 | Moyer, Jr. et al. |
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,062,781 A | 11/1962 | Bottenbruch et al. |
| 3,148,172 A | 9/1964 | Fox |
| 3,271,367 A | 9/1966 | Schnell et al. |
| 3,275,601 A | 9/1966 | Schnell et al. |
| 3,773,634 A | 11/1973 | Stacey et al. |
| 4,025,405 A | 5/1977 | Dotson et al. |
| 4,982,014 A | 1/1991 | Freitag et al. |
| 5,104,723 A | 4/1992 | Freitag et al. |
| 5,126,428 A | 6/1992 | Freitag et al. |
| 5,227,458 A | 7/1993 | Freitag et al. |
| 6,340,736 B1 | 1/2002 | Coenen et al. |
| 2005/0115901 A1 | 6/2005 | Heuser et al. |
| 2007/0055042 A1 | 3/2007 | Miyake et al. |

FOREIGN PATENT DOCUMENTS

| | | |
|---|---|---|
| CA | 2375245 A1 | 12/2000 |
| DE | 1570703 A1 | 2/1970 |
| DE | 1915063 A1 | 10/1970 |
| DE | 2063050 A1 | 7/1972 |
| DE | 2063052 A1 | 7/1972 |
| DE | 2211956 A1 | 10/1973 |
| DE | 3832396 A1 | 2/1990 |
| DE | 3833953 A1 | 4/1990 |
| EP | 0541114 A2 | 5/1993 |
| EP | 1200359 B1 | 2/2004 |
| FR | 1561518 A | 3/1969 |
| GB | 1122003 A | 7/1968 |
| GB | 1229482 A | 4/1971 |
| GB | 1341318 A | 12/1973 |
| GB | 1367788 A | 9/1974 |
| GB | 1367790 A | 9/1974 |
| JP | 2-147628 A | 6/1990 |
| JP | 3-292340 A | 12/1991 |
| JP | 3-292341 A | 12/1991 |
| JP | 8-245780 A | 9/1996 |
| WO | WO-01/38419 A1 | 5/2001 |
| WO | WO-03/070639 A1 | 8/2003 |

OTHER PUBLICATIONS

Lukach et al., "Removal of Organic Impurities from Sewage by Evaporation Through Polymer Membranes", *Journal of Engineering Physics and Thermophysics*, vol. 69, No. 6, pp. 757-759 (1996).

*Primary Examiner* — Terressa Boykin
(74) *Attorney, Agent, or Firm* — Connolly Bove Lodge & Hutz LLP

(57) ABSTRACT

A process is described for producing polycarbonate and utilizing at least some of the process waste water by concentrating the sodium chloride-containing waste water phases for the electrolysis using osmotic membrane distillation, if appropriate with simultaneous dilution of the sodium hydroxide solution obtained from the electrolysis for the polycarbonate production process.

20 Claims, 1 Drawing Sheet

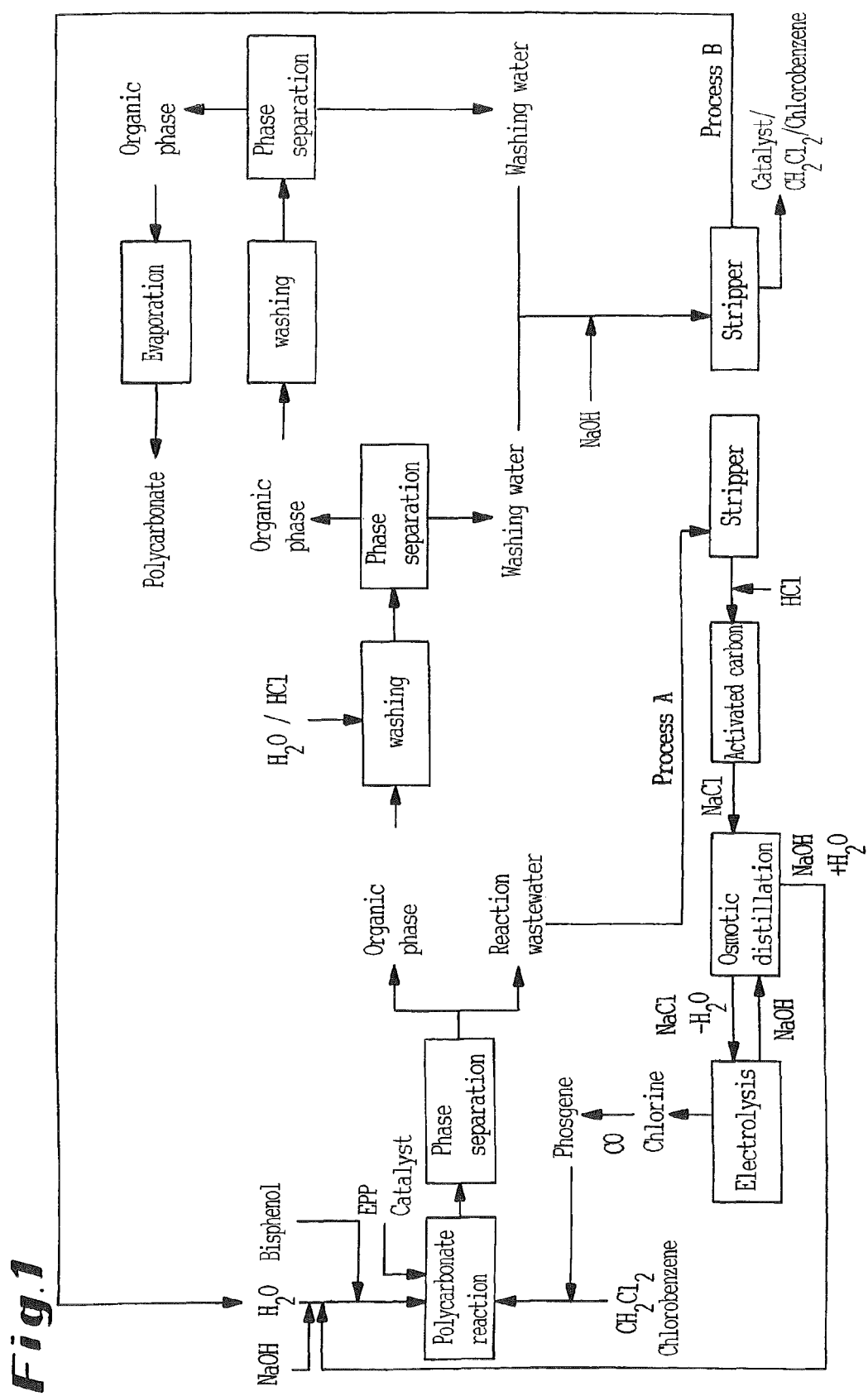

PROCESS FOR PRODUCING POLYCARBONATE

RELATED APPLICATIONS

This application claims benefit to German Patent Application No. 10 2009 023 940.5, filed Jun. 4, 2009, which is incorporated herein by reference in its entirety for all useful purposes.

BACKGROUND OF THE INVENTION

The invention relates to a process for producing polycarbonate, wherein concentration of sodium-chloride-containing process waste water from the polycarbonate phase boundary process is increased by osmotic distillation.

Polycarbonates are customarily produced by a continuous process, by producing phosgene and subsequent reaction of bisphenols and phosgene in the presence of alkali metal and a nitrogen catalyst, chain stoppers and optionally branching agents in a mixture of aqueous-alkaline phase and an organic solvent in the boundary phase.

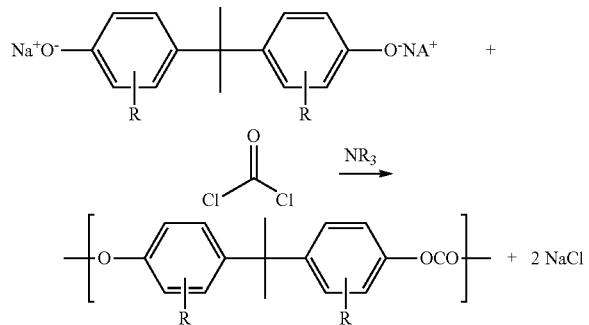

The production of polycarbonates, e.g. by the phase boundary process, is described in principle in the literature, see, e.g. in Chemistry and Physics of Polycarbonates, Polymer Reviews, H. Schnell, Vol. 9, John Wiley and Sons, Inc. (1964), pp. 50/51.

In the production of polycarbonates, the two-phase boundary process has been proven for many years. The process makes possible the production of thermoplastic polycarbonates in a number of fields of use such as, e.g. data carriers (CD, DVD), for optical applications or for medical applications.

Frequently, quality features which are described as important for the polycarbonate are good thermal stability and low yellowing. Less attention has been paid to date to the quality of the waste water occurring in the production of polycarbonates. In particular, pollution of the waste water with residual organics such as, e.g. residual phenols, is of importance here for any further treatment of the waste water, e.g. by a sewage treatment plant or by ozonolysis for oxidation of the residual organics. Here there have been a number of applications in which, however, predominantly methods for subsequent waste water treatment are described with the purpose of reducing the pollution by phenolic components as described, e.g., in JP 08 245 780 A, DE 19 510 063 A1, JP 03 292 340 A, JP 03 292 341 A and JP 02 147 628 A.

The pollution of the waste water with residual organics such as, e.g. with bisphenols or phenols, can be kept low by working with a high phosgene excess. However, this is undesirable for economic reasons.

In the production of polycarbonates with a reduced phosgene excess, there is the risk that not all of the bisphenol or all of the monophenol reacts to completion, passes into the waste water and pollutes the waste water. In addition there is the risk that the phase separation and the washing is made more difficult because surface-active phenolic OH groups remain in the polymer. As a result, not all of the water-soluble impurities may be extracted from the organic phase. This can in turn adversely affect the product quality.

It must still be emphasized that the production of polycarbonate of high quality by a continuous two-phase boundary process with simultaneously low pollution of the waste water according to the prior art is only possible with high phosgene excess or with phase separation problems associated with quality losses of the polycarbonate or by subsequent treatment of the waste water, as a result of which the economic efficiency of the process is reduced.

However, in these known processes, a high residual phenol value in the waste water of these processes, which can pollute the environment and can lead to an enhanced waste water problem for the sewage treatment plants, requires complex purification operations. For instance WO 03/070639 A1 describes removal of the organic impurities in the waste water by extracting with methylene chloride.

Customarily the sodium-chloride-containing solution is freed from solvents and organic residues and is then disposed of.

It is also known that the sodium-chloride-containing waste waters can be purified according to EP 1 200 359 A1 or U.S. Pat. No. 6,340,736 A by ozonolysis and said waste waters can then be used in sodium chloride electrolysis. A disadvantage of this process is the very costly ozonolysis.

According to EP 541 114 A2, a sodium chloride-containing waste water stream is concentrated by evaporation up to complete removal of the water and the remaining salt together with the organic impurities is subjected to a thermal treatment, as a result of which the organic components are decomposed. Particular preference is given to the use of infrared radiation. A disadvantage of the process is that the water must be completely evaporated, and so the process cannot be carried out economically.

According to WO 03/070639, the waste water from production of polycarbonate is purified by extraction and then supplied to the sodium chloride electrolysis. However, only a maximum 14% by weight of the sodium chloride from the waste water of the polycarbonate production can be recycled into the NaCl electrolysis, since in the case of larger amounts of NaCl-containing waste water, the water introduced into the electrolysis together with the NaCl-containing waste water would bring the water balance of the sodium chloride electrolysis out of equilibrium.

The sodium chloride-containing solutions which occur in the production of polycarbonate typically have a sodium chloride content of 6 to 10% by weight. Therefore, all of the sodium chloride present in the solutions cannot ever be recycled to chloride and sodium hydroxide solution in the NaCl electrolysis. At a sodium chloride concentration of 10% by weight, in the standard sodium chloride electrolysis using a commercially conventional ion-exchange membrane which exhibits water transport of 3.5 mol of water per mol of sodium, only the use of approximately 13% of the sodium chloride from the sodium chloride-containing solutions succeeds. Increase of concentration up to a saturated sodium chloride solution of approximately 25% by weight would yield a recycling rate of 38% of the sodium chloride present in the sodium chloride-containing solution. Complete recycling of the sodium chloride-containing solution is currently unknown.

Processes for raising concentration by removing water from the alkali-metal-chloride-containing waste water are known.

According to WO 01/38419, concentration of the sodium chloride-containing solution is increased by evaporation by means of a thermal process, in such a manner that a highly concentrated sodium chloride solution can be fed to the electrolysis cell. However, the evaporation is energy-intensive and costly.

Also, for example, reverse osmosis or, particularly preferably, membrane distillation or membrane contactors can be used (see MELIN; RAUTENBACH, Membranverfahren [Membrane processes]; SPRINGER, BERLIN, 2003). A disadvantage in this case is the high energy requirement to overcome the high osmotic pressures, as a result of which the process is no longer economically efficient.

The above integrated processes all have the disadvantage that, in combination with polycarbonate production only, NaCl solutions with a limited concentration (6-10% by weight) are fed to the electrolysis, and so reutilization of NaCl is only possible to a restricted extent or the concentration is energy-intensive and expensive.

Proceeding from the above-described prior art, the object is to provide a polycarbonate production process in which, during the recycling of the waste water, the reaction of sodium chloride to form chlorine and sodium hydroxide solution and possibly hydrogen can proceed with minimum energy use and therefore in a particularly economic and resource-saving manner. In addition, a process should be provided which yields products in high purity and good yield and makes possible a reduction of the environmental pollution and/or the waste water problems in sewage treatment works.

The object is achieved in that, in the process, sodium chloride-containing waste water phases are utilized by an upstream increase of concentration using an osmotic membrane distillation of the NaCl solution from the polycarbonate production for the electrolysis.

EMBODIMENTS OF THE INVENTION

An embodiment of the present invention is a process for producing polycarbonate comprising:
a) producing phosgene by reacting chlorine with carbon monoxide;
b) reacting the phosgene formed in step a) with at least one bisphenol in the presence of an aqueous alkali-metal-containing base to form a polycarbonate and an alkali-metal-chloride-containing reaction waste water solution;
c) separating off and working up the polycarbonate formed in step b) from the alkali metal chloride-containing reaction waste water solution;
e) distilling at least a portion of the alkali metal chloride-containing reaction waste water solution remaining after step c) via osmotic membrane distillation to obtain an enriched alkali metal chloride-containing solution;
f) electrochemically oxidating of at least a portion of the alkali metal chloride-containing solution from e) to obtain chlorine, an alkali metal hydroxide solution and, optionally, hydrogen.

Another embodiment of the present invention is the above process, further comprising, in a step d), separating solvent residues and, optionally, catalyst residues (d1) from the alkali-metal-chloride-containing reaction waste water solution remaining after step c) and subsequently feeding the resulting solution to the osmotic membrane distillation in step e).

Another embodiment of the present invention is the above process, wherein step d) is achieved by extracting or stripping the alkali metal chloride-containing reaction waste water solution with steam and/or subsequently treating the alkali metal chloride-containing reaction waste water solution with an adsorbent (d2).

Another embodiment of the present invention is the above process, wherein the adsorbent (d2) is activated charcoal.

Another embodiment of the present invention is the above process, wherein the osmotic membrane distillation in step e) uses an alkali metal hydroxide solution as a water acceptor.

Another embodiment of the present invention is the above process, wherein the osmotic membrane distillation in step e) is operated at a temperature in the range of from 10 to 100° C.

Another embodiment of the present invention is the above process, wherein the osmotic membrane distillation in step e) is operated at a temperature in the range of from 20 to 50° C.

Another embodiment of the present invention is the above process, wherein the osmotic membrane distillation in step e) is operated at an absolute pressure in the range of from 1.0 to 1.4 bar Another embodiment of the present invention is the above process, wherein the osmotic membrane distillation in step e) is operated at an absolute pressure in the range of from 1.1 to 1.2 bar.

Another embodiment of the present invention is the above process, wherein the osmotic membrane distillation in step e) is operated at a differential pressure in the range of from 20 to 150 bar.

Another embodiment of the present invention is the above process, wherein the osmotic membrane distillation in step e) is operated at a differential pressure in the range of from 30 to 100 bar.

Another embodiment of the present invention is the above process, wherein the osmotic membrane distillation in step e) uses an an Accurel PP membrane.

Another embodiment of the present invention is the above process, wherein at least a portion of the alkali metal chloride-containing solution obtained in step e) is added to the brine circuit of a membrane electrolysis for producing chlorine, sodium hydroxide solution and, optionally, hydrogen.

Another embodiment of the present invention is the above process, wherein additional alkali metal chloride for increasing the alkali metal chloride concentration is added to the alkali metal chloride-containing solution in the electrolysis in step f).

Another embodiment of the present invention is the above process, wherein, in d1), before treatment with an absorbent (d2), the pH of the alkali metal chloride-containing reaction waste water solution remaining after the separation in step c) is set to below 8.

Another embodiment of the present invention is the above process, wherein the at least one bisphenol is of the general formula

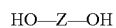

HO—Z—OH wherein Z is an aromatic moiety having from 6 to 45 carbon atoms, wherein said aromatic moiety optionally contains one or more aromatic rings, is optionally substituted, and optionally contains aliphatic moieties or cycloaliphatic moieties or heteroatoms as bridging units.

Another embodiment of the present invention is the above process, wherein the at least one bisphenol is selected from the group consisting of hydroquinone, resorcinol, dihydroxybiphenyls, bis(hydroxyphenyl)alkanes, bis(hydroxyphenyl) cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, bis(hydroxyphenyl)phthalimidines, and alkylated, ring-alkylated, and ring-halogenated compounds thereof.

Another embodiment of the present invention is the above process, wherein the at least one bisphenol is selected from the group consisting of 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene, 2,2-bis(3-methyl-4-hydroxyphenyl)-propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxy-phenyl)-2-propyl]benzene, 2-hydrocarbyl-3,3-bis(4-hydroxyphenyl)phthalimidine, 3,3-bis(4-hydroxyphenyl)-1-phenyl-1H-indol-2-one, 2,2-bis(4-hydroxyphenyl)-1-phenyl-1H-indol-2-one, 3,3-bis(4-hydroxyphenyl)-1-methyl-1H-indol-2-one, 2,2-bis(4-hydroxyphenyl)-1-methyl-1H-indol-2-one, 3,3-bis(4-hydroxyphenyl)-N-methylphthalimidine, 3,3-bis(4-hydroxyphenyl)-N-phenyl-phthalimidine, and 1,1-bis(4-hydroxyphenyl)-3,3,5-trimethylcyclohexane.

Another embodiment of the present invention is the above process, wherein step c) comprises at least the following substeps:

aa) separating an organic phase comprising the polycarbonate formed in step b) from the alkali metal chloride-containing reaction waste water solution; and bb) washing the organic phase obtained in step aa) at least once;

wherein at least a portion of the wash phase(s) from bb), optionally after separation of catalyst residues and/or organic solvent residues, is used as a partial substitute of the water for producing the aqueous alkali metal hydroxide solution for use in step b).

Another embodiment of the present invention is the above process, wherein the alkali metal of the alkali metal chloride-containing reaction waste water solution is sodium.

BRIEF DESCRIPTION OF THE DRAWING

FIG. 1 depicts an embodiment of the present invention.

DESCRIPTION OF THE INVENTION

It has been found that in the continuous production of polycarbonate by reaction of bisphenols and phosgene in an inert solvent or solvent mixture in the presence of alkali metal and nitrogen catalyst, improved recycling of sodium chloride from the sodium chloride-containing waste water solutions occurring in the boundary phase can be achieved, the sodium chloride-containing waste water solutions occurring in the boundary phase can be concentrated without complex purification directly in an osmotic membrane distillation after setting the pH to a pH less than or equal to 8 and after simple treatment with activated carbon, and electrochemical oxidation of the resultant sodium chloride to give chlorine, sodium hydroxide solution and optionally hydrogen can be achieved, wherein the chlorine can be recycled for producing the phosgene.

The invention therefore relates to a process for producing polycarbonate and utilizing the resultant waste water phases. In particular, the process comprises concentration, by osmotic membrane distillation, of the alkali metal chloride-containing waste water phases occurring in the polycarbonate production process, for processing in a downstream alkali metal chloride electrolysis. In the process, optionally, simultaneously a sodium hydroxide solution formed in the electrolysis can be diluted which can be used subsequently directly as starting material in the polycarbonate process.

The process according to the invention comprises at least the following steps:

(a) producing phosgene by reacting chlorine with carbon monoxide, (b) reacting the phosgene formed as per step a) with at least one bisphenol in the presence of an aqueous alkali metal-containing base, in particular a sodium-containing base, if appropriate a nitrogen catalyst, and if appropriate organic solvent, to form a polycarbonate and an alkali metal chloride-containing reaction waste water solution, in particular a sodium chloride-containing reaction waste water solution, (c) separating off and working up the polycarbonate formed in step b), (d) if appropriate separating off the solvent residues and, if appropriate catalyst residues, from the alkali metal chloride-containing solution (d1) remaining from step c), in particular by extraction or stripping the solution with steam and subsequent treatment with adsorbents (d2), in particular with activated carbon, (e) osmotic membrane distillation of at least some of the alkali metal chloride-containing solution remaining from step c) or d)

(f) electrochemical oxidation of at least some of the alkali metal chloride-containing solution from e), forming chlorine, alkali metal hydroxide solution and, if appropriate, hydrogen.

In a particularly preferred embodiment, the process is characterized in that, after the substep d1), before the treatment with adsorbents (d2), the solution is adjusted to a pH less than or equal to 8, preferably 6 to 8.

In a further particular embodiment, at least some of the chlorine produced according to step f) is recycled to the production of phosgene according to step a).

In a further preferred embodiment, at least some of the alkali metal hydroxide solution produced according to step f) is used as water acceptor in the osmotic membrane distillation according to step e).

In a further particularly preferred embodiment, at least some of the dilute alkali metal hydroxide solution obtained according to step e) is recycled to the production of polycarbonate according to step b).

The alkali metal chloride-containing solution obtained after the separation according to step c) (reaction waste water) can be used in the osmotic membrane distillation, alone or combined with the wash phases from the workup (total process waste water), preferably alone, after optional separation of solvent residues and, if appropriate catalyst residues, according to step d).

Suitable bisphenols are those of the general formula

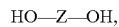

where Z is an aromatic moiety having 6 to 45 carbon atoms which can contain one or more aromatic rings, can be substituted and can contain aliphatic moieties or cycloaliphatic moieties or heteroatoms as bridging units can be used. Examples of such compounds which can be used in the process according to the invention are dihydroxydiarylalkanes such as hydroquinone, resorcinol, dihydroxybiphenyl, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, bis(hydroxyphenyl)phthalimidines and also alkylated, ring-alkylated and ring-halogenated compounds thereof.

Preferred bisphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)-propane (bisphenol A, BPA), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane, 2-hydrocarbyl-3,3-bis(4-hydroxyaryl)phthalimidine, 3,3-bis(4-hydroxyaryl)-1-aryl-1H-indol-2-one, 2,2-bis(4-hydroxyaryl)-1-aryl-1H-indol-2-one, and 1,1-bis(4-hydroxyphenyl)-3,3,5-trimethylcyclohexane (bisphenol TMC).

Particularly preferred bisphenols are 4,4'-dihydroxydiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane, 2-hydrocarbyl-3,3-bis(4-hydroxyphenyl)phthalimidine, 3,3-bis(4-hydroxyphenyl)-1-phenyl-1H-indol-2-one, 2,2-bis(4-hydroxyphenyl)-1-phenyl-1H-indol-2-one, 3,3-bis(4-hydroxyphenyl)-1-methyl-1H-indol-2-one, 2,2-bis(4-hydroxyphenyl)-1-methyl-1H-indol-2-one, 3,3-bis(4-hydroxyphenyl)-N-methylphthalimidine, 3,3-bis(4-hydroxyphenyl)-N-phenylphthalimidine and 1,1-bis(4-hydroxyphenyl)-3,3,5-trimethylcyclohexane (bisphenol TMC).

These and other suitable bisphenols are described, e.g. in U.S. Pat. No. 2,970,131 A, U.S. Pat. No. 2,991,273 A, U.S. Pat. No. 2,999,835 A, U.S. Pat. No. 2,990,846 A, U.S. Pat. No. 3,028,365 A, U.S. Pat. No. 3,062,781 A, U.S. Pat. No. 3,148,172 A, U.S. Pat. No. 3,271,367 A, U.S. Pat. No. 3,275,601 A, U.S. Pat. No. 3,271,367 A and U.S. Pat. No. 4,982,014 A, in the German laid-open publications DE 1 570 703 A, DE 2 063 050 A, DE 2 036 052 A, DE 2 211 956 A, DE 3 832 396 A and DE 38 33 953 A, the French patent document FR 1 561 518, in the monograph by H. Schnell, Chemistry and Physics of Polycarbonates, Interscience Publishers, New York 1964, pp. 28ff; page 102ff and by D. G. Legrand, J. T. Bendler, Handbook of Polycarbonate Science and Technology, Marcel Dekker New York 2000, pp. 72ff.

It may be emphasized here that the process according to the invention can be used virtually for all known bisphenols.

Suitable chain stoppers and branching agents are known from the literature. Some are described, for example, in DE 38 33 953 A. Preferred chain stoppers are phenol, cumylphenol, isooctylphenol and para-tert-butylphenol.

Preferred branching agents are trisphenols and tetraphenols and also 3,3-bis(3-methyl-4-hydroxyphenyl)-2-oxo-2,3-dihydroindole.

The alkali metal used for forming the bisphenolate can be an alkali metal hydroxide solution having hydroxides from the series: Na, K, Li hydroxide, if appropriate, alkaline earth metal hydroxides can also be used. Preference is given to sodium hydroxide solution and, in the novel process, is preferably used as a 10 to 55% by weight solution.

Catalysts which come into consideration for the reaction b) are all catalysts known for the production of polycarbonates by the two-phase boundary layer method, such as tertiary amines, N-alkylpiperidines or pyridine.

The amine catalyst used can be open-chain or cyclic, particular preference is given to triethylamine and ethylpiperidine. The catalyst is used in the novel process preferably as a 1 to 55% by weight solution.

Phosgene can be used in the process step b) in the liquid state, gaseous state or dissolved in an inert solvent.

In the novel process, in step b), inert organic solvents which are preferably usable are all known solvents which are able to dissolve polycarbonate by at least 5% by weight at temperatures around 20° C., and also mixtures thereof. Preference is given, for example, to dichloromethane, toluene, the various dichloroethanes and chloropropane compounds, chlorobenzene and chlorotoluene. Preferably, dichloromethane, or a mixture of dichloromethane and chlorobenzene is used. Particular preference is given to dichloromethane and mixtures of dichloromethane and monochlorobenzene in the ratio of 20:80 parts by weight to 75:25 parts by weight.

Over the entire reaction, a pH between 9 and 14 is set, preferably between 9.5 and 13.0. This is achieved in that once at the start the amount of alkali metal hydroxide solution necessary to dissolve the bisphenols is used and, furthermore, upstream of the heat exchanger a first resupply of the alkali metal hydroxide solution is performed, and subsequently thereto upstream of the tubular reactors, if appropriate together with the chain stopper a second resupply of the alkali metal hydroxide solution is performed.

The polycarbonates attainable by the process according to the invention can be used industrially in a known manner as any desired shaped bodies or else plates and films, for example in the car sector or in optical applications, optical and magneto-optic storage media.

The reaction profile for step b) proceeds preferably continuously and particularly preferably in plug flow without great back-mixing. This can be achieved, therefore, for example in tubular reactors. The mixing of the two phases (aqueous and organic phase) can be effected by installed tube orifices, static mixers and/or, for example, pumps.

The reaction according to step b) proceeds particularly preferably in two stages.

In the first stage of the preferred process, the reaction is started by bringing together the starting materials phosgene, the inert solvent or solvent mixture, which preferably acts only as solvent for the phosgene, and the bisphenol, which preferably is already dissolved in advance in the alkali metal hydroxide solution. The residence time in the first stage is typically in the range from 2 seconds to 300 seconds, particularly preferably in the range from 4 seconds to 200 seconds. The pH of the first stage is set by the ratio of alkali metal hydroxide solution/bisphenol/phosgene in such a manner that the pH is in the range from 11.0 to 12.0, preferably 11.2 to 11.8, particularly preferably 11.4 to 11.6. The reaction temperature of the first stage is held by cooling preferably <40° C., particularly preferably <35° C.

In the second stage of the preferred process, the reaction to give the polycarbonate is completed. The residence time in the preferred process is 1 minute to 2 hours, preferably 2 minutes to 1 hour, very particularly preferably 3 minutes to 30 minutes. In the second stage of the preferred process, control is performed by permanent monitoring of the pH (in the continuous process this is preferably measured on-line by processes which are known in principle) and corresponding adjustment of the pH by addition of the alkali metal hydroxide solution. The amount of alkali metal hydroxide solution fed is set, in particular, such that the pH of the reaction mixture in the second process stage is in the range from 7.5 to 10.5, preferably 8 to 9.5, very particularly preferably 8.2 to 9.3. The reaction temperature of the second stage is held by cooling at preferably <50° C., particularly preferably <40° C., very particularly preferably <35° C.

The parameters or comments listed in this application generally or in preferred ranges can, however, also be combined as desired among themselves, that is to say between the respective ranges and preferred ranges.

In the preferred process, in step b), phosgene is used in relation to the bisphenol in the molar ratio of 1:2 to 1:2.2. The solvent is added in such a manner that the polycarbonate is in a 5 to 60% by weight solution, preferably 20 to 45% by weight solution after the reaction.

The concentration of the catalyst is preferably 0.0001 mol to 0.1 mol, based on the bisphenol used.

After the reaction b), in step c), preferably the organic, polycarbonate-containing phase is customarily washed with an aqueous liquid and separated from the aqueous phase as far as possible after each washing operation. The washes are preferably performed with demineralized water. The polycarbonate solution, after the washing and separation of the washing liquid, is customarily cloudy. As washing liquid, aqueous liquids for separating off the catalyst, e.g. a dilute mineral acid such as HCl or $H_3PO_4$, are used, and for further purification demineralized water. The concentration of HCl or $H_3PO_4$ in the wash liquid can be, for example, 0.5 to 1.0% by weight. The organic phase is preferably washed, for example, once, preferably several times.

Phase separation devices which can be used for separating off the wash liquid from the organic phase can be separation vessels, phase separators, centrifuges or coalescers which are known in principle, or else combinations of these appliances.

This gives, in this manner, without taking into account the solvent which is still to be separated off, surprisingly high degrees of purity of the polycarbonate of >99.85%.

In a preferred embodiment of the process according to the invention, the wash liquids which are separated off in step c), if appropriate after separation of catalyst residues and/or organic solvent residues, can be recycled back into the process according to the invention.

The separation and workup according to step c) of the polycarbonate formed in step b) can preferably comprise at least the following steps:
aa) separation of polycarbonate-containing organic phase and aqueous alkali metal chloride-containing reaction waste water solution
bb) washing at least once, preferably at least twice, particularly preferably five times, the polycarbonate-containing organic phase obtained in step aa) and separating off the respective wash liquid.

If appropriate it can be necessary to separate at least one of the wash liquid(s) obtained according to step c) bb) from catalyst residues and if appropriate organic solvent residues by setting the pH to at least 9, preferably at least 10, particularly preferably 10 to 11, by addition of at least one basic compound, and to subject it to a subsequent extraction with at least one inert organic solvent, or preferably to subsequent stripping of the solution with steam. Suitable basic compounds for setting the pH are, for example, alkali metal or alkaline earth metal hydroxides or carbonates. The basic compounds can be used in solid form or in the form of their aqueous solutions. Preferably, alkali metal hydroxide solutions are used, particularly preferably sodium hydroxide solution. In step (d1), also, these pHs are preferably set using the abovementioned compounds.

Preferably, at least some of the wash liquid(s) from step c) bb) can be used as partial replacement of the water for the production, in particular for setting the concentration of the sodium hydroxide solution for step b). In a preferred embodiment of the process according to the invention, at least some of the wash liquid(s) from step c) bb) can be used for diluting the alkali metal hydroxide solution produced according to step e) and/or f), before they are recycled into the production of polycarbonate according to step b).

The preferred embodiment of the process according to the invention in which the wash liquids separated off in step c) are recirculated back to the process according to the invention offers the additional advantage of lower waste water emission.

After the synthesis of the polycarbonate, the polycarbonate is separated off in the form of its solution in the organic solvent or solvent mixture used in the synthesis, for example methylene chloride or methylene chloride/chlorobenzene.

For obtaining the high-purity polycarbonate, the solvent is evaporated. The evaporation can proceed in a plurality of evaporator stages. For example, this is performed by one or more series-connected distillation columns in which the solvent is separated off from the polycarbonate.

The purification stage c) or stages can be carried out, for example, continuously, in such a manner that the pot temperature in the distillation is 150° C. to 310° C., preferably 160 to 230° C. The pressure employed for carrying out this distillation is in particular 1 to 1000 mbar, preferably 5 to 100 mbar.

The polycarbonates thus purified are distinguished by very good product properties, and so subsequently shaped parts can be produced therefrom in excellent quality.

The remaining alkali metal chloride-containing solution according to step c) is advantageously freed from highly volatile organic impurities such as, e.g., residues of the organic solvent used in the synthesis and if appropriate catalyst, for example by distillation or steam stripping. There then remains a waste water having a high content of dissolved sodium chloride (5-10% by weight) and dissolved sodium carbonates (0.3-1.5% by weight). The carbonates are formed, e.g., by hydrolysis of the phosgene as a side reaction of polycarbonate production. In addition, the waste water is polluted with organic compounds, e.g. with phenols (e.g. unsubstituted phenol, alkylphenols).

The treatment of the prepurified waste water with adsorbents then preferably proceeds using activated carbon.

According to a preferred process, the pH is reduced using hydrochloric acid or hydrogen chloride after the process substep d1) before treatment with absorbents (d2). Preferably, the pH is reduced to less than 8, particularly preferably to 4 to 8. The use of the cheaper sulphuric acid, which is conceivable in principle, but unwanted in the present process, would lead to sodium sulphate being formed in the pH reduction such that it would be enriched in the subsequent electrolysis in the anolyte circuit. Since, e.g. the ion-exchange membranes, according to the manufacturer's instructions, may only be operated up to a certain sodium sulphate concentration in the anolyte, more anolyte would have to be ejected than when hydrochloric acid or hydrogen chloride is used, the reaction product of which is the wanted sodium chloride.

A preferred process variant is that water is removed from the alkali metal chloride-containing waste water by a concentration process.

Increasing concentration of NaCl solutions by osmotic distillation is energy-saving, in particular when, in a preferred embodiment, the NaOH solution originating from the NaCl electrolysis is used as water acceptor. This has advantages, particularly when in the polycarbonate production a dilute sodium hydroxide solution is used, in which case, additionally the water for diluting the sodium hydroxide solution can be saved.

Particular preference is therefore given to a process characterized in that the concentration of the alkali metal chloride-containing solution from d), before the electrolysis f), is increased by means of osmotic distillation in step e) using sodium hydroxide solution as water acceptor.

By combination of operation of the electrolysis cells according to the invention and concentration increase process according to the invention, theoretically up to 68% of the sodium chloride can be recovered from the waste water. This applies to the case that the sodium chloride electrolysis produces only the chlorine required for the phosgene production and the sodium hydroxide solution required for the polycarbonate production, and no chlorine for other applications.

The osmotic distillation proceeds via molecular diffusion and, if appropriate, Knudsen diffusion, of steam through a membrane. The diffusion rate is thereby dependent on the difference between the steam pressures on both sides of the membrane, and also on its porosity, thickness and tortuosity.

In order to enable efficient increase of concentration, a concentrated solution of an alkali metal hydroxide, preferably sodium hydroxide or potassium hydroxide, particularly preferably sodium hydroxide, should be used as water acceptor.

For the process according to the invention, a chemically resistant material such as, e.g. polypropylene, should be used as membrane material. The membranes used should preferably be capillary membranes having a capillary length of 30-6000 µm, and a diameter of 0.01 to 0.7 µm.

Particularly suitable membranes are lipophilic membranes such as, for example, Accurel PP 50/200, Accurel PP 50/280, Accurel PP 150/330, Accurel PP Q3/2 or Accurel S 6/2 from the Membrana company.

The process is preferably operated in such a manner that the osmotic distillation is operated at a temperature of 10 to 100° C., preferably 20 to 50° C. The temperature of the sodium hydroxide solution used can be higher than that of the NaCl-containing waste water.

The osmotic distillation is operated at an absolute pressure of 1 to 1.4 bar, preferably at a pressure of 1.1 to 1.2 bar.

The pressure ratios between alkali metal chloride solution and alkali metal hydroxide solution are selected in such a manner, in particular, that the osmotic pressure of the alkali metal chloride solution is higher than the pressure of the alkali metal hydroxide solution.

The differential pressure between alkali metal chloride solution and alkali metal hydroxide solution should be, in a particularly preferred process, 20 to 150 bar, preferably 30 to 100 bar.

The alkali metal chloride electrolysis process will be described in more detail hereinafter. The description hereinafter may be considered by way of example with reference to the electrolysis of sodium chloride, since in the process as described above, in principle any alkali metal chloride can be used (in particular LiCl, NaCl, KCl), but the use of sodium chloride or sodium hydroxide solution in the above stages is the preferred embodiment of the process.

Customarily, e.g. for the electrolysis of sodium-chloride-containing solutions, membrane electrolysis processes are used (see in this context Peter Schmittinger, CHLORINE, Wiley-VCH Verlag, 2000). In this case a two-part electrolysis cell is used which consists of an anode chamber having an anode and a cathode chamber having a cathode. Anode chamber and cathode chamber are separated by an ion-exchange membrane. A sodium chloride-containing solution having a sodium chloride concentration of customarily more than 300 g/l is introduced into the anode chamber. At the anode the chloride ion is oxidized to chlorine which is conducted out of the cell together with the depleted sodium chloride-containing solution (approximately 200 g/l). The sodium ions migrate under the influence of the electric field through the ion-exchange membrane into the cathode chamber. During this migration each mol of sodium, depending on the membrane, is accompanied by between 3.5 and 4 mol of water. As a result, the anolyte becomes depleted in water. In contrast to the anolyte, on the cathode side, owing to the electrolysis of water to hydroxide ions and hydrogen, water is consumed. The water passing together with the sodium ions into the catholyte is sufficient to keep the sodium hydroxide solution concentration in the effluent to 31-32% by weight, this at an intake concentration of 30% by weight and a current density of 4 kA/m$^2$. In the cathode chamber, water is electrochemically reduced, wherein hydroxide ions and hydrogen are formed.

Alternatively, also a gas diffusion electrode can be used as cathode, at which oxygen is reacted with electrons to give hydroxide ions, with no hydrogen being formed. The hydroxide ions form sodium hydroxide solution together with the sodium ions which have passed into the cathode chamber via the ion-exchange membrane. A sodium hydroxide solution having a concentration of 30% by weight is customarily fed into the cathode chamber and a sodium hydroxide solution having a concentration of 31-32% by weight removed. The purpose is to achieve a sodium hydroxide solution concentration as high as possible, since customarily the sodium hydroxide solution is stored or transported as a 50% by weight hydroxide solution. Commercially available membranes, however, are currently not stable to a hydroxide solution having a higher concentration than 32% by weight, and so the sodium hydroxide solution must be concentrated by thermal evaporation.

In the case of the sodium chloride electrolysis, additional water is introduced into the anolyte via this sodium chloride-containing solution, but only water is discharged via the membrane into the catholyte. If more water is introduced via the sodium-chloride-containing solution than can be transported to the catholyte, the anolyte becomes depleted in sodium chloride and the electrolysis cannot be operated continuously. At very low sodium chloride concentrations, the side reaction of oxygen formation would start.

In order to feed maximum amounts of sodium chloride-containing solutions economically to the sodium chloride electrolysis, it can be useful that the water transport via the membrane is increased. This can be performed by selection of suitable membranes such as described in U.S. Pat. No. 4,025,405 A. The effect of increased water transport is that the otherwise customary water addition to maintain the hydroxide solution concentration can be omitted.

According to U.S. Pat. No. 3,773,634 A, at high water transport through the membrane, the electrolysis can be operated when a hydroxide solution concentration of 31 to 43% by weight and a sodium chloride concentration of 120 to 250 g/l are used.

A disadvantage of both processes is the lower current yield of these processes, which impairs the economic efficiency of the electrolysis.

According to the preferred process, the sodium chloride-containing reaction waste water is separated off d2) after the phase separation and the removal of the solvent and catalyst used if appropriate, by extraction or stripping with steam and, after setting the pH, via an activated carbon treatment.

Hereafter, the alkali metal-chloride-containing waste water can be fed directly to the osmotic distillation e).

Compared with the prior art (WO 03/70639 A), in which a maximum 13% of the sodium chloride present in the waste water of the polycarbonate production can be used in the NaCl electrolysis, by means of the process according to the invention, more than 13% of the sodium chloride can be recovered from the waste water.

The novel process can also be carried out using an alkali metal chloride electrolysis in which no hydrogen is generated at the cathode, but the cathode is replaced by a gas-diffusion electrode at which oxygen is reduced to hydroxide ions.

If, e.g. in an integrated site, no hydrogen is required for chemical reactions, the obligatorily produced hydrogen can be dispensed with. The advantage is an energy saving in the electrolysis, attributable to the lower electrolysis voltage when a gas-diffusion electrode is used.

The sodium chloride-containing solution arriving from the polycarbonate production customarily has a sodium chloride content of up to 10% by weight, if it is the reaction waste water. If the reaction waste water is combined with the wash water, then the NaCl concentration is, for example approximately 6% by weight. If the electrolysis delivers the chlorine and the sodium hydroxide solution exclusively for the polycarbonate production, then the sodium chloride-containing waste water can only be used to a minor extent in the electrolysis. For instance, in the case of the customary ion-exchange membranes and the standard operating parameters of the sodium chloride electrolysis, only approximately 7% of the sodium chloride of a 6% by weight sodium chloride-containing polycarbonate waste water solution can be used. The standard operating parameters of the NaCl electrolysis are a brine concentration in the effluent of 200 to 240 g/l and an NaOH concentration of 31-32% by weight. Complete recycling of the sodium chloride which occurs has therefore not been possible to date. Concentration by thermal evaporation of the water is not currently economic, since the sodium chloride is available as a very inexpensive product.

Using the process according to the invention, significantly more than 13% of the sodium chloride from the waste waters occurring can be recycled at a concentration of 10% by weight, if the sodium chloride electrolysis provides the chlorine and the sodium hydroxide solution solely for polycarbonate production. Customarily, sodium chloride electrolyses are operated at integrated chemical sites having a plurality of chlorine consumers and so a sodium chloride-containing solution is not available for recycling from all consumers. The fraction of reusable sodium chloride from the waste water increases when the sodium chloride electrolysis has not to provide the sodium hydroxide solution and the chlorine exclusively for polycarbonate production.

A further preferred variant of the novel process is that the concentration of the waste water of the polycarbonate production is increased by solid alkali metal chloride and is fed to the alkali metal chloride electrolysis. By this means more than 50% of the alkali metal chloride from the polycarbonate waste water could be reused.

This, however, implies that the chlorine and the alkali metal hydroxide solution are not used solely for polycarbonate production.

Particularly preferably, an alkali metal chloride-containing waste water having a pH less than 7 is used in or fed to the electrolysis f). The pH is adjusted preferably using hydrochloric acid, but can also be adjusted using gaseous hydrogen chloride.

In a further preferred process, the NaCl electrolysis is operated in such a manner that the NaCl solution which arrives from the cell, has an NaCl concentration of less than 200 g/l. Concurrently, the hydroxide solution exiting the cell may have a concentration of less than 30% by weight.

The transport of water through the ion-exchange membrane depends not only on the operating parameters, but also on the type of membrane used. The process according to the invention utilizes such ion-exchange membranes which under the conditions according to the invention of the sodium chloride concentration and hydroxide solution concentration, enable transport of water through the membrane of more than 4.5 mol of water per mol of sodium.

The current density is calculated in this process on the basis of the membrane area and is, in particular, 2 to 6 kA/m$^2$. Particularly preferably, anodes having a relatively high surface area are used. Anodes having a relatively high surface area are taken to mean those in which the physical surface area is significantly greater than the projected surface area. Anodes having a relatively high surface area are, e.g., electrodes constructed in a foam-like or felt-like manner. By this means at the anode, a very high electrode surface area is offered and the local current density is greatly decreased. The surface area of the anode is preferably selected in such a manner that the local current density, based on the physical surface area of the electrode, is less than 3 kA/m$^2$. The higher the surface area and the lower the local current density, the lower the sodium chloride concentration in the brine can be selected and the greater is the fraction of sodium chloride from the waste water which can be recycled.

The pH of the alkali metal chloride-containing waste water, before the electrolysis f), should preferably be less than 7, particularly preferably 0.5 to 6.

The alkali metal chloride electrolysis should be operated in such a manner that the alkali metal chloride concentration of the alkali metal chloride solution arriving from the cell is between 100 to 280 g/l of sodium chloride and/or such that the concentration of the alkali metal hydroxide solution which arrives from the cell is 13 to 33% by weight. Particular preference is given to concentrations which enable operation of the cell at relatively low voltages. For this, the concentration of the alkali metal chloride solution arriving from the cell should preferably between 110 to 220 g/l of alkali metal chloride and/or the concentration of the alkali metal hydroxide solution which arrives from the cell should be 20 to 30% by weight.

The ion-exchange membranes used in the electrolysis should have a transport of water per mol of sodium of preferably greater than 4.0 mol of $H_2O$/mol of sodium, particularly preferably 4.5 to 6.5 mol of $H_2O$/mol of sodium.

The process is preferably operated in such a manner that the electrolysis f) is carried out at a temperature of 70 to 100° C., preferably at 80 to 95° C.

The electrolysis is operated at an absolute pressure of 1 to 1.4 bar, preferably at a pressure of 1.1 to 1.2 bar.

The pressure ratios between anode chamber and cathode chamber are selected, in particular, in such a manner that the pressure in the cathode chamber is higher than the pressure in the anode chamber.

The differential pressure between cathode chamber and anode chamber should be, in a particularly preferred process, 20 to 150 mbar, preferably 30 to 100 mbar.

At lower alkali metal chloride concentrations, special anode coatings can also be used. In particular, the coating of the anode can contain, in addition to ruthenium oxide, also other noble metal components of subgroup 7 and 8 of the Periodic Table of the Elements. For example, the anode coating can be doped with palladium compounds. Coatings based on diamonds are equally usable.

The examples hereinafter are intended to illustrate the present invention, without restricting it however.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The examples are intended to describe the process according to the invention with reference to concentrating the sodium chloride-containing waste water phases occurring in the production of polycarbonate and the simultaneous dilution of the sodium hydroxide solution obtained from the electrolysis for the polycarbonate production process by osmotic membrane distillation and electrolysis of the resultant sodium chloride-containing solutions.

Example 1 a) Production and Workup of the Polycarbonate

In a pumped circulation reactor, upstream of the pump, 24 000 kg/h of an alkaline Bisphenol A solution which contains 15% by weight of BPA and 2.1 mol of sodium hydroxide solution per mol of BPA are metered in via a T piece, and also via a further T piece 1848 kg/h of phosgene dissolved in 20 400 kg/h of solvent which consists of 50% by weight of methylene chloride and 50% by weight of monochlorobenzene are metered in.

To maintain the alkalinity, 360 kg/h of 32% by weight sodium hydroxide solution are added and the reaction mixture is passed via a heat exchanger and an unstirred dwell time vessel back to the pump, wherein the above mentioned mass streams are added.

By means of flow metering, the pumped circulation rate is determined at 260 $m^3$/h.

The temperature is 36° C.

A subquantity of the emulsion, which is equal in size to the influent raw materials, is fed upstream of the metering points for BPA and phosgene from the dwell time vessel of a further pump and pumped through a tubular reactor. To this stream are added 1050 kg/h of sodium hydroxide solution (32% by weight) and also 134 kg/h of p-tert-butylphenol, dissolved in 536 kg of solvent mixture. After a dwell time of 10 min, 18 kg/h of N-ethylpiperidine are added in the form of a 4.8% by weight solution in solvent mixture (50 parts of methylene chloride and 50 parts of monochlorobenzene) and the emulsion is pumped by means of a further pump through a further tubular reactor.

After a dwell time of a further 10 min, the emulsion is separated in a separation vessel and the polycarbonate solution is washed free of electrolyte by known processes, e.g. by a centrifuge technique.

The polycarbonate solution is concentrated in evaporation units and freed from residual solvent on a degassing extruder.

The following analytical data were determined on the polycarbonate granules:
YI=1.35 (measured as specified in ASTM E 313)
Eta rel=1.195 (measured as specified in ISO 1628/4)
Phenolic OH=85 ppm (measured by UV spectroscopy at 546 nm after staining the phenolic end groups with $TiCl_4$)

The reaction waste water is not combined here with the wash phases and is freed from solvent residues and catalyst by stripping with steam. After neutralizing with hydrochloric acid and treating with activated carbon, the reaction waste water contains 9.0% by weight of NaCl and <2 ppm of free BPA and phenols, measured by UV spectroscopy of the aqueous phase at 294 nm, e.g. in a Perkin-Elmer spectrometer.

It can be fed without further purification to the osmotic membrane distillation.

b) Increasing Concentration of the Sodium Chloride Solution (Reaction Waste Water) by Osmotic Membrane Distillation The osmotic distillation was carried out at room temperature in a module which had a membrane surface area of 1 $m^2$. A membrane of the Accurel PP 150/330 type from Membrana was used. Into the module, 2.3 L of the 9.0% by weight sodium chloride-containing reaction waste water solution from a) were pumped, whereas 1 L of 31.0% by weight sodium hydroxide solution was metered in as water-receiving phase in co-current. The concentration of the reaction waste water solution exiting from the cell after 210 minutes was 18.0% by weight of NaCl, while the NaOH solution taken off was depleted to 16.0% by weight.

The concentrated reaction waste water solution exiting from the cell can be fed to the electrolysis without further purification.

c) Electrochemical Oxidation of the Sodium Chloride Solution from the Osmotic Distillation The electrolysis is carried out, by way of example, in a laboratory electrolysis cell having an anode surface area of 0.01 $m^2$. The current density was 4 kA/$m^2$, temperature at the outlet on the cathode side 88° C., temperature at the outlet on the anode side 89° C. An electrolysis cell having a standard anode and cathode coating from DENORA, Germany was used. A Nafion 982 WX ion-exchange membrane from DuPont was used. The electrolysis voltage was 3.02 V. A sodium chloride-containing solution was circulated through the anode chamber by pumping at a mass flow rate of 1.0 kg/h. The concentration of the solution fed to the anode chamber was 25% by weight of NaCl. From the anode chamber, a 20% by weight NaCl solution could be taken off. To the NaCl solution taken off from the anode chamber was added 0.137 kg/h of 18.0% by weight concentrated reaction waste water from the polycarbonate production and 0.0641 kg/h of solid sodium chloride. The solution was subsequently fed back to the anode chamber. The transport of water through the membrane was 3.5 mol of water per mol of sodium. Of the NaCl solution arriving from the cell, 1% was discarded, equivalent to 0.008 kg/h of a 20.2% by weight NaCl-containing solution.

On the cathode side, a sodium hydroxide solution was circulated by pumping at a mass flow rate of 1.107 kg/h. The concentration of the sodium hydroxide solution fed into the cathode side was 30% by weight of NaOH, and the sodium hydroxide solution taken off from the cathode side had a concentration of 31.9% by weight NaOH. Of the 31.9% by weight hydroxide solution, 0.187 kg/h was taken off from the volume stream and the remainder was replenished with 0.0664 kg/h of water and recirculated back to the cathode element. Of the reacted sodium chloride, 27.8% originates from the polycarbonate reaction waste water.

d) Recycling the Dilute Sodium Hydroxide Solution from the Osmotic Distillation to the Polycarbonate Production The dilute sodium hydroxide solution from b) is fed to the polycarbonate production. A mixture of 6.5% by weight sodium hydroxide solution produced by diluting the 16.0% by weight sodium hydroxide solution from b) with demineralized water, and bisphenol is combined with a solvent mixture of methylene chloride/chlorobenzene and phosgene and processed as described in 1a).

By using the 16.0% by weight sodium hydroxide solution, instead of the customary 32% by weight sodium hydroxide solution, 25.5% demineralized water can be saved.

Example 2 a) Production and Workup of the Polycarbonate

The process as described in example 1a) is carried out, but the reaction waste water is combined with the wash phases to form total process waste water and freed from solvent residues and catalyst by stripping with steam. After neutralization with hydrochloric acid and treatment with activated carbon, the total process waste water contains 6.2% by weight NaCl and <2 ppm of free BPA and phenols, measured by UV spectroscopy of the aqueous phase at 294 nm, e.g. in a Perkin-Elmer spectrometer. The total process waste water can be fed to the osmotic membrane distillation without further purification.

b) Concentrating the Sodium Chloride Solution (Total Process Waste Water) by Osmotic Membrane Distillation The osmotic distillation was carried out at room temperature by way of example in a module which had a membrane surface area of 1 m². A membrane of the Accurel PP 150/330 type from Membrana was used. The total process waste water from a) containing 6.2% by weight sodium chloride was pumped into the module at a flow rate of 19.5 L/h, while 13.0 L/h 33% by weight sodium hydroxide solution were metered in co-current as water-receiving phase. Owing to the great reduction in volume of the NaCl solution, 1 L is replenished once after 20 minutes. The concentration of the process waste water solution exiting from the cell after 75 minutes was 15.2% by weight of NaCl, while the NaOH solution taken off was depleted to 16.6% by weight.

The enriched total process waste water solution exiting from the cell can be fed to the electrolysis without further purification.

c) Electrochemical Oxidation of the Sodium Chloride Solution from the Osmotic Distillation The electrolysis is carried out by way of example in a laboratory electrolysis cell having an anode surface area of 0.01 m². The current density was 4 kA/m², temperature at the outlet on the cathode side 88° C., temperature at the outlet on the anode side 89° C. An electrolysis cell having standard anode and cathode coatings from DENORA, Germany was used. A DuPont Nafion 982 WX ion-exchange membrane was used. The electrolysis voltage was 3.02 V. A sodium-chloride-containing solution was pumped through the anode chamber at a mass flow rate of 1.0 kg/h. The concentration of the solution fed to the anode chamber was 25% by weight of NaCl. From the anode chamber, a 20% by weight NaCl solution could be taken off. To the NaCl solution taken off from the anode chamber was added 0.132 kg/h of 15.2% by weight enriched total process waste water from the osmotic membrane distillation under b) and 0.0686 kg/h of solid sodium chloride. The solution was subsequently fed back into the anode chamber. The transport of water through the membrane was 3.5 mol of water per mol of sodium. Of the NaCl solution arriving from the cell, 1% was discarded, equivalent to 0.008 kg/h of a 20.2% by weight NaCl-containing solution.

On the cathode side, a sodium hydroxide solution was circulated by pumping at a mass flow rate of 1.107 kg/h. The concentration of the sodium hydroxide solution fed into the cathode side was 30% by weight of NaOH, and the sodium hydroxide solution taken off from the cathode side had a concentration of 31.9% by weight NaOH, and 0.187 kg/h of the 31.9% by weight hydroxide solution was taken off from the volume stream, and the remainder was replenished with 0.0664 kg/h of water and recirculated back to the cathode element.

Of the sodium chloride reacted, 22.7% originates from the polycarbonate total process waste water.

d) Recycling the Dilute Sodium Hydroxide Solution from the Osmotic Distillation into the Polycarbonate Production The dilute sodium hydroxide solution from b) is fed to the polycarbonate production. A mixture of 6.5% by weight sodium hydroxide solution, produced by diluting the 16.6% by weight sodium hydroxide solution from b) with demineralized water, and bisphenol is combined with a solvent mixture of methylene chloride/chlorobenzene, and phosgene and the process as described in 1 a) is carried out.

By using the 16.6% by weight sodium hydroxide solution instead of the customary 32% by weight sodium hydroxide solution, 23.7% of demineralized water can be saved.

Example 3 a) Production and Workup of the Polycarbonate

A reaction waste water from the polycarbonate production, obtained as described in example 1a), is here not combined with the wash phases and is freed from solvent residues and catalyst by stripping with steam. After neutralization with hydrochloric acid and treatment with activated carbon, the reaction waste water contains 10% by weight NaCl and <2 ppm of free BPA and phenols, measured by UV spectroscopy of the aqueous phase at 294 nm, e.g. in a Perkin-Elmer spectrometer. The reaction waste water can be fed to the osmotic membrane distillation without further purification.

b) Increasing Concentration of the Sodium Chloride Solution (Reaction Waste Water) by Osmotic Membrane Distillation The reaction waste water from a) is concentrated to 18.0% by weight by osmotic membrane distillation according to the process described in 1b) and fed to the electrolysis with gas-diffusion electrode.

c) Electrochemical Oxidation of the Sodium Chloride Solution from the Osmotic Distillation Using a Gas-Diffusion Electrode The concentrated waste water was equivalent in quality as per example 1b). Since hydrogen is not required for the production of DPC, the formation of hydrogen during the electrolysis can be omitted. The electrolysis was therefore operated using gas-diffusion electrodes. The current density was 4 kA/m$^2$, temperature at the outlet on the cathode side 88° C., temperature at the outlet on the anode side 89° C. An electrolysis cell having standard anode coating from DENORA, Germany was used. A DuPont Nafion 982 WX ion-exchange membrane was used. The electrolysis voltage was 2.11 V. Into the anode chamber was metered 0.8 kg/h of a 25% by weight NaCl-containing solution. The sodium chloride concentration of the solution taken off from the anode chamber was 19.8% by weight of NaCl. To the NaCl solution taken off from the anode chamber were added 0.180 kg/h of 18.0% by weight reaction waste water and 0.0557 kg/h of solid sodium chloride. The solution was subsequently fed back into the anode chamber. The transport of water through the membrane was 4.9 mol of water per mol of sodium.

On the cathode side, a sodium hydroxide solution was circulated by pumping at a mass flow rate of 1.107 kg/h. The concentration of the sodium hydroxide solution fed into the cathode side was 30.0% by weight of NaOH, and the sodium hydroxide solution taken off from the cathode side had a concentration of 31.0% by weight of NaOH. Of the 31.0% by weight hydroxide solution, 0.192 kg/h was taken off from the volume stream, and the remainder was replenished with 0.0345 kg/h of water and recirculated back to the cathode element. The fraction of reacted sodium chloride from the polycarbonate reaction waste water was 36.9%.

Comparative Example 4 a) Production and Workup of the Polycarbonate

A reaction waste water from the polycarbonate production, obtained as described in example 3a), is not combined with the wash phases and is freed from solvent residues and catalyst by stripping with steam. After neutralization with hydrochloric acid and treatment with activated carbon, the reaction waste water contains 10.0% by weight NaCl and <2 ppm of free BPA and phenols, measured by UV spectroscopy of the aqueous phase at 294 nm, e.g. in a Perkin-Elmer spectrometer. The reaction waste water is used directly in the electrolysis without concentration.

b) Electrochemical Oxidation of the Sodium Chloride Solution (Reaction Waste Water)

The electrolysis was carried out by way of example in a laboratory electrolysis cell having an anode surface area of 0.01 m$^2$. The current density was 4 kA/m$^2$, temperature at the outlet on the cathode side 88° C., temperature at the outlet on the anode side 89° C. An electrolysis cell having standard anode and cathode coatings from DENORA, Germany was used. A DuPont Nafion® 982 20 WX ion-exchange membrane was used. The electrolysis voltage was 3.02 V. A sodium chloride-containing solution was circulated through the anode chamber by pumping at a mass flow rate of 1.0 kg/h. The concentration of the solution fed to the anode chamber was 25% by weight of NaCl. From the anode chamber, a 20% by weight NaCl solution could be taken off. To the NaCl solution taken off from the anode chamber was added 0.125 kg/h of 10.0% by weight reaction waste water from the polycarbonate production and 0.076 kg/h of solid sodium chloride. The solution was subsequently fed back to the anode chamber. The transport of water through the membrane was 3.5 mol of water per mol of sodium. Of the NaCl solution arriving from the cell, 1% was discarded, equivalent to 0.008 kg/h of a 20.0% by weight NaCl-containing solution.

On the cathode side, a sodium hydroxide solution was circulated at a mass flow rate of 1.107 kg/h. The concentration of the sodium hydroxide solution fed into the cathode side was 30.0% by weight of NaOH, and the sodium hydroxide solution taken off from the cathode side had a concentration of 31.9% by weight of NaOH. Of the 31.9% by weight hydroxide solution, 0.188 kg/h was taken off from the volume stream, and the remainder was replenished with 0.0664 kg/h of water and recirculated back to the cathode element.

Only 14.0% of the reacted sodium chloride originates from the polycarbonate reaction waste water.

Comparative Example 5 a) Production and Workup of the Polycarbonate

The reaction waste water of comparative example 4 was used.

b) Electrochemical Oxidation of the Sodium Chloride Solution (Reaction Waste Water) Using a Gas-Diffusion Electrode Since no hydrogen is required for the production of polycarbonate, the formation of hydrogen in the electrolysis can be omitted. The electrolysis was therefore operated using gas-diffusion electrodes. The current density was 4 kA/m$^2$, temperature at the outlet on the cathode side 88° C., temperature at the outlet on the anode side 89° C. An electrolysis cell having a standard anode coating from DENORA, Germany, was used. A DuPont Nafion 982 WX ion-exchange membrane was used. The electrolysis voltage was 2.11 V. A 25.0% by weight NaCl solution was fed into the anode chamber at 0.65 kg/h, and the solution taken off from the anode chamber contained 18% by weight NaCl. To the NaCl solution taken off from the anode chamber was added 0.163 kg/h of 10.0% by weight reaction waste water and 0.0715 kg/h of solid sodium chloride. The solution was subsequently fed back to the anode chamber. The transport of water through the membrane was 4.9 mol of water per mol of sodium.

On the cathode side, a sodium hydroxide solution was circulated by pumping at a mass flow rate of 1.107 kg/h. The concentration of the sodium hydroxide solution fed into the cathode side was 30.0% by weight of NaOH, and the sodium hydroxide solution taken off from the cathode side had a concentration of 31.0% by weight of NaOH. Of the 31.0% by weight hydroxide solution, 0.192 kg/h was taken off from the volume stream, and the remainder was replenished with 0.0345 kg/h of water and recirculated back to the cathode element.

The fraction of reacted sodium chloride from the polycarbonate reaction waste water was 18.6%.

The examples show that a significantly higher recycling rate of sodium chloride can be achieved in the waste water solutions of the polycarbonate production process in the electrolysis after concentration by osmotic membrane distillation, wherein the water taken up by the alkali metal hydroxide solution can be saved in the production of the alkali metal hydroxide solution in the polycarbonate production step.

The invention claimed is:
1. A process for producing polycarbonate comprising:
 a) producing phosgene by reacting chlorine with carbon monoxide;
 b) reacting the phosgene formed in step a) with at least one bisphenol in the presence of an aqueous alkali metal containing base to form a polycarbonate and an alkali metal chloride-containing reaction waste water solution;
c) separating off and working up the polycarbonate formed in step b) from the alkali metal chloride-containing reaction waste water solution;
e) distilling at least a portion of the alkali metal chloride-containing reaction waste water solution remaining after step c) via osmotic membrane distillation to obtain an enriched alkali metal chloride-containing solution;
f) electrochemically oxidating of at least a portion of the alkali metal chloride-containing solution from e) to obtain chlorine, an alkali metal hydroxide solution and, optionally, hydrogen.

2. The process of claim 1, further comprising, in a step d), separating solvent residues and, optionally, catalyst residues (d1) from the alkali metal chloride-containing reaction waste water solution remaining after step c) and subsequently feeding the resulting solution to the osmotic membrane distillation in step e).

3. The process of claim 2, wherein step d) is achieved by extracting or stripping the alkali metal chloride-containing reaction waste water solution with steam and/or subsequently treating the alkali metal chloride-containing reaction waste water solution with an adsorbent (d2).

4. The process of claim 3, wherein the adsorbent (d2) in activated charcoal.

5. The process of claim 2, wherein the osmotic membrane distillation in step e) uses an alkali metal hydroxide solution as a water acceptor.

6. The process of claim 1, wherein the osmotic membrane distillation in step e) is operated at a temperature in the range of from 10 to 100° C.

7. The process of claim 6, wherein the osmotic membrane distillation in step e) is operated at a temperature in the range of from 20 to 50° C.

8. The process of claim 1, wherein the osmotic membrane distillation in step e) is operated at an absolute pressure in the range of from 1.0 to 1.4 bar.

9. The process of claim 1, wherein the osmotic membrane distillation in step e) is operated at an absolute pressure in the range of from 1.1 to 1.2 bar.

10. The process of claim 1, wherein the osmotic membrane distillation in step e) is operated at a differential pressure in the range of from 20 to 150 bar.

11. The process of claim 1, wherein the osmotic membrane distillation in step e) is operated at a differential pressure in the range of from 30 to 100 bar.

12. The process of claim 1, wherein the osmotic membrane distillation in step e) uses an an Accurel PP membrane.

13. The process of claim 1, wherein at least a portion of the alkali metal chloride-containing solution obtained in step e) is added to the brine circuit of a membrane electrolysis for producing chlorine, sodium hydroxide solution and, optionally, hydrogen.

14. The process of claim 1, wherein additional alkali metal chloride for increasing the alkali metal chloride concentration is added to the alkali metal chloride-containing solution in the electrolysis in step f).

15. The process of claim 2, wherein, in d1), before treatment with an absorbent (d2), the pH of the alkali metal chloride-containing reaction waste water solution remaining after the separation in step c) is set to below 8.

16. The process of claim 1, wherein the at least one bisphenol is of the general formula

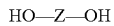

wherein Z is an aromatic moiety having from 6 to 45 carbon atoms, wherein said aromatic moiety optionally contains one or more aromatic rings, is optionally substituted, and optionally contains aliphatic moieties or cycloaliphatic moieties or heteroatoms as bridging units.

17. The process of claim 1, wherein the at least one bisphenol is selected from the group consisting of hydroquinone, resorcinol, dihydroxybiphenyls, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl) sulphoxides, α,α'-bis(hydroxyphenyl)diisopropylbenzenes, bis(hydroxyphenyl)phthalimidines, and alkylated, ring-alkylated, and ring-halogenated compounds thereof.

18. The process of claim 1, wherein the at least one bisphenol is selected from the group consisting of 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene, 2,2-bis(3-methyl-4-hydroxyphenyl)propane, bis(3,5-dimethyl-4-hydroxyphenyemethane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene, 2-hydrocarbyl-3,3-bis(4-hydroxyphenyl)-phthalimidine, 3,3-bis(4-hydroxyphenyl)-1-phenyl-1H-indol-2-one, 2,2-bis(4-hydroxyphenyl)-1-phenyl-1H-indol-2-one, 3,3-bis(4-hydroxyphenyl)-1-methyl-1H-indol-2-one, 2,2-bis(4-hydroxyphenyl)-1-methyl-1H-indol-2-one, 3,3-bis(4-hydroxyphenyl)-N-methylphthalimidine, 3,3-bis(4-hydroxyphenyl)-N-phenyl-phthalimidine, and 1,1-bis(4-hydroxyphenyl)-3,3,5-trimethylcyclohexane.

19. The process of claim 1, wherein step c) comprises at least the following substeps:
cc) separating an organic phase comprising the polycarbonate-formed in step b) from the alkali metal chloride-containing reaction waste water solution; and
dd) washing the organic phase obtained in step aa) at least once;
wherein at least a portion of the wash phase(s) from bb), optionally after separation of catalyst residues and/or organic solvent residues, is used as a partial substitute of the water for producing the aqueous alkali metal hydroxide solution for use in step b).

20. The process of claim 1, wherein the alkali metal of the alkali metal chloride of the alkali metal chloride-containing reaction waste water solution is sodium.

* * * * *